Jan. 16, 1962   A. V. SPARR   3,016,877
MILK PIPE LINE
Filed Oct. 26, 1959   2 Sheets-Sheet 1
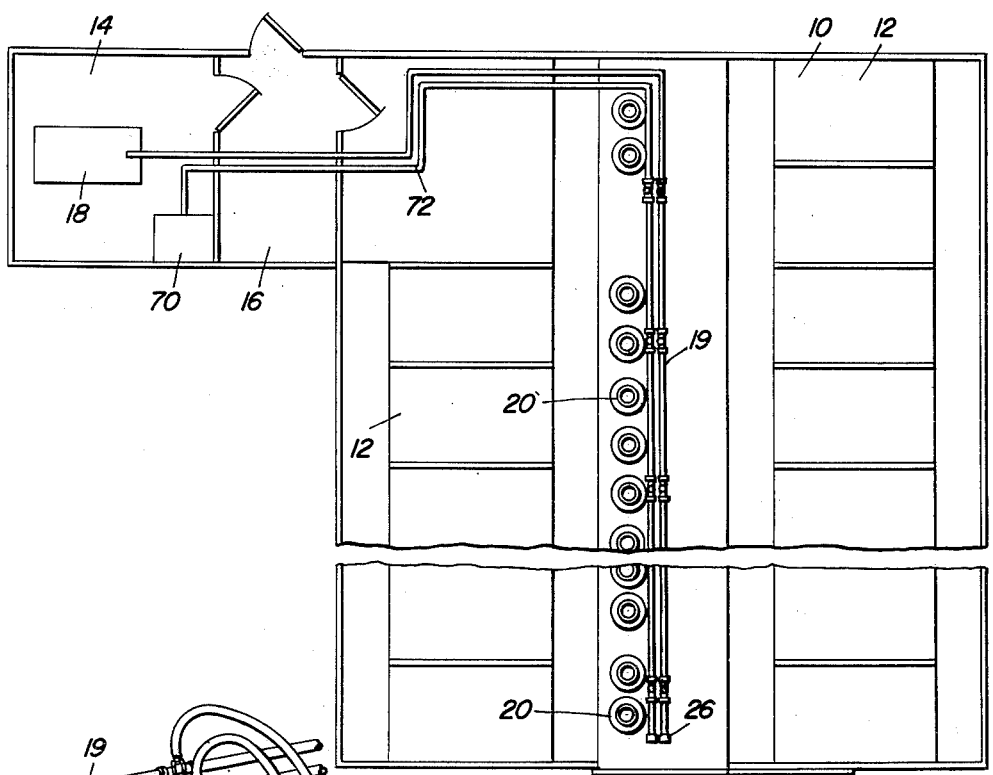
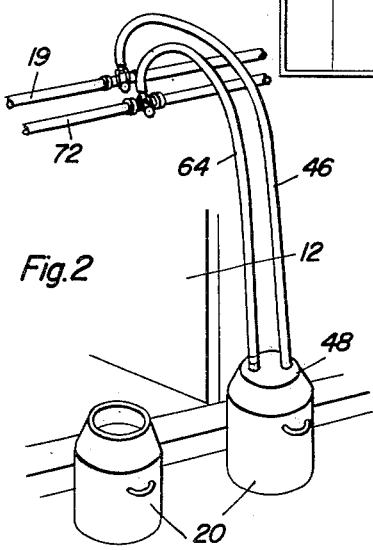
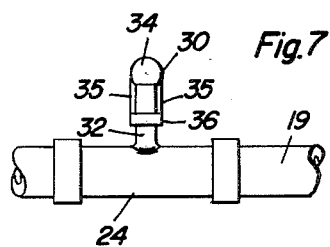
Anders V. Sparr
INVENTOR.

Jan. 16, 1962 A. V. SPARR 3,016,877
MILK PIPE LINE
Filed Oct. 26, 1959 2 Sheets-Sheet 2
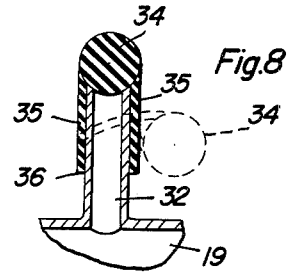
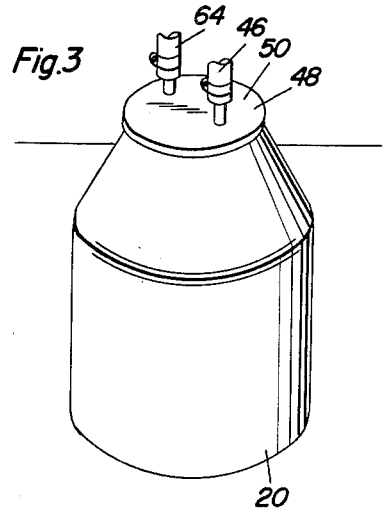
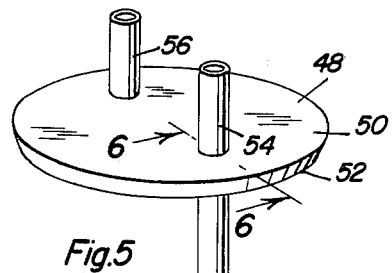
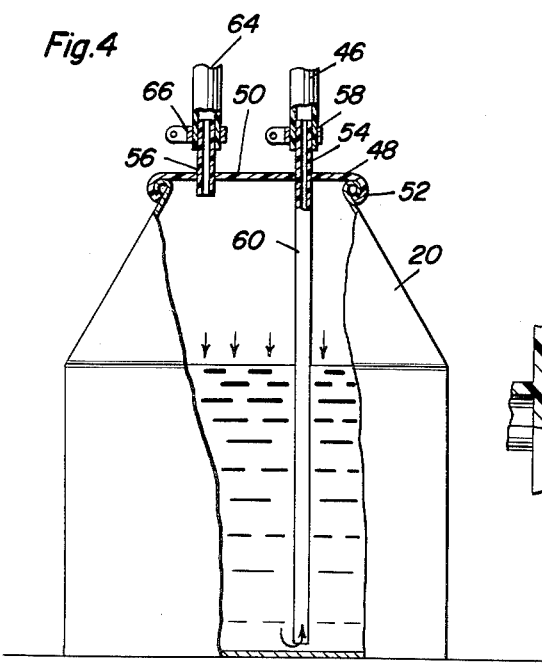
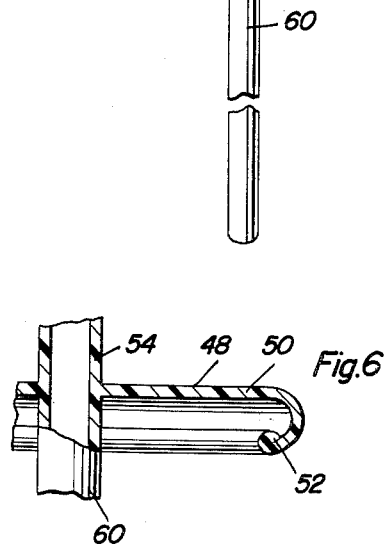
Anders V. Sparr
INVENTOR.
BY *Clarence A.O'Brien*
*and Harvey B. Jacobson*
Attorneys United States Patent Office 3,016,877
Patented Jan. 16, 1962

3,016,877
MILK PIPE LINE
Anders V. Sparr, Rte. 2, Waupun, Wis.
Filed Oct. 26, 1959, Ser. No. 848,806
4 Claims. (Cl. 119—14.03)

This invention relates to milk handling systems and more particularly to a system to convey milk from the barn to the milk house.

Some farmers carry a tremendous quantity of milk in each day. For instance a typical farmer may carry as much as a ton of milk in 50 pound buckets which, combined insofar as trips are concerned, amounts to more than a mile of walking.

There is already available equipment that will solve the walking and carrying the milk, and that is commonly known as pipe line milking. It operates on a vacuum principle and the milk goes directly from the milker to a pipe line and to the cooling tank. For this type of equipment the farmer must have all new, expensive apparatus.

An object of this invention is to provide a milk conveying system which should retail for about one-half or less, of the cost of vacuum pipe line apparatus, and still provide a very good advantage in that the milk may be tested at each can.

Briefly, the invention is embodied in a pipe made of an improved material such as stainless steel, glass or plastic in about ten to fifteen foot lengths joined with couplings to form the milk line. The pipe line may hang in the center of the barn leading to the milk house and to the cooling tank. There is a pressure line together with a special fitting for the top of milk cans, and short lengths of hose coupled with the pressure line and successive cans in order to remove the milk by pressure— as opposed to vacuum—from the milk cans and push it through the line to a remote location, for instance, the cooling tank in the milk house.

These together with other objects and advantagse which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic plan view of a barn and milk house equipped with a system for delivering the milk from the cans to the milk house cooling tank.

FIGURE 2 is a fragmentary perspective view showing a portion of the system.

FIGURE 3 is a perspective view of a conventional milk can equipped with a special adapter.

FIGURE 4 is an elevational view of the milk can in FIGURE 3, parts broken away in section.

FIGURE 5 is a perspective view of the adapter in FIGURE 3 and in FIGURE 4.

FIGURE 6 is an enlarged sectional view taken on the line 6—6 of FIGURE 5.

FIGURE 7 is an enlarged elevational view showing a coupling and valve detail of one of the lines.

FIGURE 8 is a sectional view of the valve in FIGURE 7.

In the accompanying drawings reference is first made to FIGURE 1. A conventional barn 10 equipped with stanchions 12 and all of the other usual appurtenances in a milking barn, is shown as the preferred environment for the invention. Milk house 14 is separated from the barn by vestibule 16, this also being a conventional arrangement. Further, a conventional cooling tank 18 is shown in the milk house.

The milk delivery system includes milk line 19 extending down the center of the barn, and adjacent to which there are a plurality of conventional milk cans 20. Line 19 is preferably made of a number of pipe sections joined together by means of couplings 24 and capped as at 26 at one end thereof. The opposite end of the line is connected with a cooling tank 18.

Couplings 24 may be standard couplings having valves 30 (FIGURES 7 and 8). Valve 30 includes a valve body 32 in the form of nipple registered with the milk line, and there is a valve member 34 seated on the outer end of the nipple. Valve member 34 is a resilient ball having two or more resilient straps 36 connected to it and also connected to resilient band 36 that encircles the nipple. As shown in FIGURE 8, the ball may be flipped to the side to open the valve, or returned to the seated position thereby closing valve 30.

There is an adapter for the milk can, and it may be made in a number of ways, one of which is to have a flexible plastic panel 50 with a rolled bead 52 at its periphery and which snaps over the upper open end of milk can 20 forming an air tight seal. Two nipples 54 and 56 are secured to the plate of adapter 48, and they communicate the interior of the can with the exterior thereof. Line 46 is connected to nipple 54 and held tightly in place by means of hose clamp 58. Tube 60 forms a longitudinal extension of nipple 54 and extends to a position very close to the bottom of can 20. Line 64 is connected to nipple 56 and held tightly in place by means of hose clamp 66. The line 64 extends to compressor 70 which applies air under pressure into can 20 as shown in FIGURE 6, in order to apply pressure on the top of the milk in the can 20 and force it up tube 60 and through line 46. The milk extends through line 19 by way of the valve 30 and flows to the cooling tank.

The compressor 70 may be operated by a small electric motor, a gasoline engine or may be even operated manually. Regardless, air pressure line 72 extends from the compressor and approximately parallels line 19. Couplings with valves the same as in FIGURES 7 and 8 are in pressure line 72.

The farmer starts at one end of line 19, connects adapter 48 to the first can 20 and couples hoses 46 and 64 to the adjacent valve 30 in the milk line and pressure line. Then the compressor is operated. This applies air under pressure to the head of the milk column in the can, forcing the milk from the can space into pipe line 19 and to the cooling tank. Then the valves 30 are closed and the farmer moves to the next can and follows the same procedure. Soon all of the milk cans are empty, and the milk is delivered to the cooling tank with the farmer making only one trip up the aisle, successively connecting adapter 48 with the cans and lines 19 and 72. The arrangement described makes it convenient to clean line 19 by delivering water through it under pressure from line 72.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in conveying milk by way of a valved milk delivery line from a conventional-type milk filled bucket in a cow barn to a storing and cooling tank in a milk house; a conventional-type milk bucket, a lid fitted airtight atop said bucket, a pressurized air feeding nipple secured to the lid and having a lower end portion depending and terminating in the upper space of the bucket, a compressed air hose connected communicatively at one end to said nipple and separably connectible at its other end to a valve provided therefor in a compressed air supply pipe, a bucket emptying milk nipple also connected to said lid and having a lower portion depending into said bucket and terminating adjacent the bottom of the bucket and an upper hose connecting portion projecting above the lid, and a separate hose connected with the upper end of said bucket emptying nipple and connectible with the valve provided therefor in said milk delivery line.

2. The structure defined in claim 1 wherein all of the valves provided in said lines are standardized, said hoses having free ends which are quickly and separably connectible with their respective valves whereby as soon as one bucket is emptied and the milk therein has been delivered to the cooling tank via the delivery milk line, the lid with its nipples and hoses may be removed from the empty bucket and attached to the next succeeding one and applied to the top thereof and the free ends of the hoses separably connected to the next-used pair of valves.

3. In a system wherein milk may be forcibly flushed from a conventional-type milk bucket, a milk delivery pipe line adapted to deliver milk into a storing and cooling tank, said pipe line being provided with normally closed hose accommodating and connecting valves, a second pipe line for delivering compressed air and also provided with hose accommodating and connecting normally closed valves, each valve having a nipple to which a manually attachable and detachable milk hose may be separably connected, at least one conventional open-top milk bucket, a readily applicable and removable closure fitted in an airtight manner atop and temporarily closing said bucket, a pressurized air introducing nipple carried by said closure and having a hose connected therewith and detachably connectible with said first-named hose accommodating and connecting valve, a milk discharging nipple also connected with said closure and adapted to depend into the bucket and terminating at its milk intake end adjacent the bottom of the bucket, and a bucket-emptying milk hose connected with an upper end of said discharging nipple and separably connectible with a cooperatively associated nipple on the valve provided therefor in the milk delivery pipe line.

4. In combination, a milk conveying pipe line having at least one valved milk inlet nipple, a compressed air pipe line adjacent the milk pipe line and having a pressured air discharge nipple with a valve, a conventional-type milk bucket, a readily applicable and removable lid fitted in an air-tight manner atop said bucket, a pressurized air feeding nipple secured to the lid with a lower end portion depending and terminating in the upper space of the bucket, a hose connected communicatively at one end to said nipple, and separably connectible at its other end to a valve provided therefor in a compressed air supply pipe, a bucket-emptying milk nipple also connected to said lid and having a lower portion depending into said bucket and terminating adjacent the bottom of the bucket and an upper hose connecting portion projecting above the lid, and a separate hose connected with the upper end of said bucket-emptying nipple and connectible with the valve provided therefor in said milk delivery pipe line.

References Cited in the file of this patent

UNITED STATES PATENTS

| | | |
|---|---|---|
| 178,213 | Voute | May 30, 1876 |
| 739,150 | Canon | Sept. 15, 1903 |
| 1,070,246 | Gray et al. | Aug. 12, 1913 |
| 1,910,830 | Hapgood | May 23, 1933 |
| 2,102,267 | Hodsdon | Dec. 14, 1937 |
| 2,603,396 | Redin et al. | July 15, 1952 |
| 2,667,855 | Scott | Feb. 2, 1954 |
| 2,865,391 | Duncan | Dec. 23, 1958 |